(12) United States Patent
Nelson et al.

(10) Patent No.: US 7,543,832 B2
(45) Date of Patent: Jun. 9, 2009

(54) VARIABLE RATE STABILIZER BAR

(75) Inventors: Stephen L. Nelson, Osceola, WI (US); Louis J. Brady, Wyoming, MN (US); Jeffrey D. Bennett, Roseau, MN (US); Geoffrey G. White, St. Croix Falls, WI (US)

(73) Assignee: Polaris Industries Inc., Medina, MN (US)

( * ) Notice: Subject to any disclaimer, the term of this patent is extended or adjusted under 35 U.S.C. 154(b) by 112 days.

(21) Appl. No.: 11/340,301

(22) Filed: Jan. 26, 2006

(65) Prior Publication Data

US 2007/0170681 A1 Jul. 26, 2007

(51) Int. Cl.
*B60G 21/055* (2006.01)
*B60G 11/18* (2006.01)
*B60G 11/14* (2006.01)

(52) U.S. Cl. ............... 280/124.107; 267/277; 267/275; 267/285; 267/190

(58) Field of Classification Search .......... 280/124.107, 280/124.106; 267/277, 273, 274, 275, 285, 267/188, 190, 286
See application file for complete search history.

(56) References Cited

U.S. PATENT DOCUMENTS

| | | | | |
|---|---|---|---|---|
| 704,813 | A * | 7/1902 | Byrnes | ............... 213/22 |
| 1,971,960 | A | 8/1934 | Huntman | |
| 2,106,886 | A | 2/1938 | Chisholm, Jr. | |
| 2,107,082 | A | 2/1938 | Paton | |
| 2,152,661 | A | 4/1939 | Paton | |
| 2,343,079 | A * | 2/1944 | Pickwell | ............... 464/60 |
| 3,603,577 | A * | 9/1971 | DeRaad | ............... 267/151 |
| 3,718,326 | A * | 2/1973 | Ristau | ............... 267/140 |
| 3,844,583 | A | 10/1974 | Sakow et al. | |
| 4,094,532 | A | 6/1978 | Johnson et al. | |
| 4,206,935 | A | 6/1980 | Sheppard et al. | |
| 4,429,900 | A | 2/1984 | Feher | |
| 4,648,620 | A * | 3/1987 | Nuss | ............... 280/5.511 |
| 4,796,911 | A | 1/1989 | Kuroki et al. | |
| 4,863,148 | A * | 9/1989 | Hufnagel | ............... 267/278 |
| 4,919,444 | A * | 4/1990 | Leiber et al. | ............... 280/5.511 |

(Continued)

OTHER PUBLICATIONS

"How do stabilizer bars work?" (nd), Retrieved Apr. 20, 2006 from http://auto.howstuffworks.com/question432.htm.

(Continued)

*Primary Examiner*—John Q. Nguyen
*Assistant Examiner*—Karen Amores
(74) *Attorney, Agent, or Firm*—Baker & Daniels LLP

(57) ABSTRACT

Various embodiments of variable rate stabilizer bars are disclosed, including apparatus, vehicle, and kit implementations. Embodiments may have first and second stabilizer bar members. Each stabilizer bar member may be adapted to be operatively coupled to a respective, opposite ground-engaging element of a vehicle. Each stabilizer bar member may be configured to experience a torque about their longitudinal axis upon movement of the respective ground-engaging element relative to the vehicle when operatively coupled to the ground-engaging elements. Embodiments may have a torque transfer regulator, which may be operatively coupled to both stabilizer bar members. The torque transfer regulator may be configured to transfer a portion of the torque experienced by one of the stabilizer bar members to the other stabilizer bar member. Some embodiments may provide for active control of the degree of torque transfer from one ground-engaging element's suspension system to the other.

35 Claims, 13 Drawing Sheets

U.S. PATENT DOCUMENTS

| | | | |
|---|---|---|---|
| 4,962,943 A | 10/1990 | Lin | |
| 4,973,077 A * | 11/1990 | Kuwayama et al. | 280/124.107 |
| 5,217,245 A | 6/1993 | Guy | |
| 5,251,926 A | 10/1993 | Aulerich et al. | |
| 5,288,101 A | 2/1994 | Minnett | |
| 5,882,017 A | 3/1999 | Carleer | |
| 5,934,696 A * | 8/1999 | Bloser et al. | 280/124.106 |
| 6,022,030 A | 2/2000 | Fehring | |
| 6,296,073 B1 * | 10/2001 | Rioux et al. | 180/292 |
| 6,318,737 B1 * | 11/2001 | Marechal et al. | 280/5.511 |
| 6,345,831 B1 | 2/2002 | deMarcellus | |
| 6,520,510 B1 | 2/2003 | Germain et al. | |
| 6,651,991 B2 * | 11/2003 | Carlstedt et al. | 280/5.511 |
| 6,698,767 B2 * | 3/2004 | Hagan | 280/5.511 |
| 6,851,690 B1 | 2/2005 | Oledzki | |
| 7,100,926 B2 * | 9/2006 | Osterlanger et al. | 280/5.502 |
| 7,121,559 B2 * | 10/2006 | Ersoy et al. | 280/5.511 |
| 7,237,785 B2 * | 7/2007 | Kraus et al. | 280/124.106 |
| 7,287,759 B2 * | 10/2007 | Uchiyama et al. | 280/5.511 |
| 2003/0034195 A1 * | 2/2003 | Rioux et al. | 180/292 |
| 2003/0137090 A1 * | 7/2003 | Reichel et al. | 267/188 |
| 2004/0169346 A1 | 9/2004 | Ersoy et al. | |
| 2005/0156390 A1 * | 7/2005 | Marini et al. | 279/74 |
| 2007/0108681 A1 * | 5/2007 | Rhodes et al. | 267/273 |

OTHER PUBLICATIONS

"The Steering/suspension System (overview)" (nd); Retrieved Apr. 20, 2006 from http://www.innerauto.com/Automotive_Definitions/The_Steering~Suspension_System_Overview/.

"Steering and Suspension In Action" (nd); Retrieved Apr. 20, 2006 from http://www.innerauto.com/Automotive_Definitions/Steering_And_Suspension_In_Action/.

"Sway Bar" (nd); Retrieved Apr. 20, 2006 from http://www.innerauto.com/Automotive_Definitions/Sway_Bar.

"Torsion Bars" (nd); Retrieved Apr. 20, 2006 from http://www.innerauto.com/Automotive_Definitions/Torsion_Bars/.

Comeskey, John and Walker, James; "Improved Handling with Anti-Sway Bars" (nd); Retrieved Apr. 20, 2006 from Google's cache of http://groups.com/MyNAZARia/resources.msnw?action=get_message&mview+O&D_Message=762&LastModified=4675507617382273666 as retrieved on Jul. 13, 2005 05:33:26 GMT.

"Wheeling Alignment" (nd); Retrieved Apr. 26, 2006 from http://www.innerauto.com/Automotive_Definitions/Wheel_Alignment/.

Walker, James; "Anti-Sway Bar Bushing Q&A" (nd); Retrieved Apr. 24, 2006 from http://www.teamscr.com/swaybar.html.

* cited by examiner

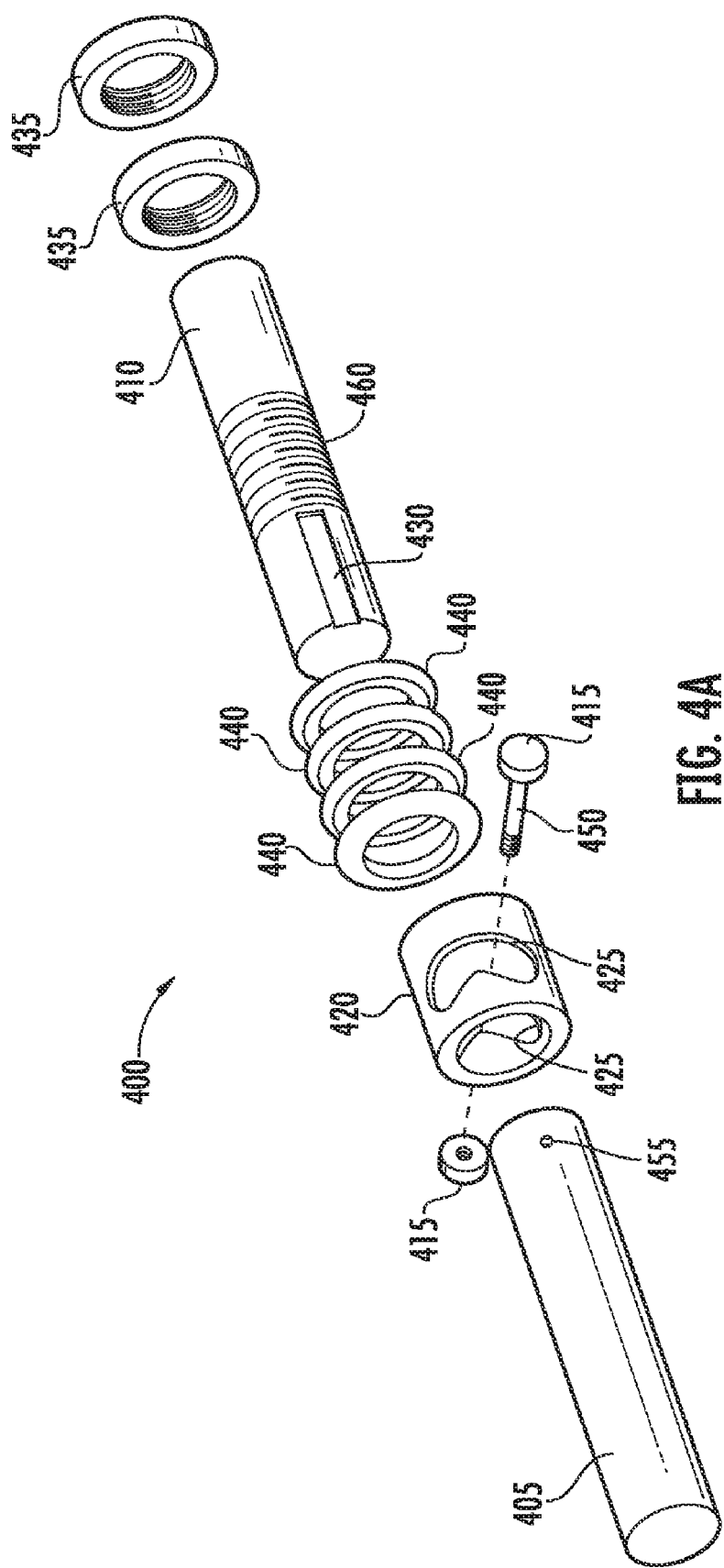

VARIABLE RATE STABILIZER BAR

TECHNICAL FIELD

This document relates to vehicle suspensions and, more particularly, to stabilizer bars with variable rates of torque transfer.

BACKGROUND

Vehicle suspension systems play a significant role in determining the comfort level of a vehicle's ride. Stabilizer bars are one component of a vehicle's suspension system. Stabilizer bars are designed to counteract centrifugal forces when cornering on a vehicle, such as ATVs, utility vehicles, and snowmobiles. Counteracting such centrifugal forces attempts to prevent the inside front and rear wheels from lifting off the ground and to keep all four wheels on the ground, thereby maintaining traction when making a turn. This allows the vehicle to corner considerably faster.

In effect, the stabilizer bar provides a torsional transverse connection between the independent suspensions of a pair of ground wheels. During a turn, this connection provides interaction between the two independent spring suspensions to share in resisting spring deflection imposed on the independent spring suspension of the outer wheel due to centrifugal force. The connection transmits such deflection to the independent spring suspension of the inner wheel. During straight-away driving, this connection may become a hindrance by limiting the amount the wheels are able to travel or spring independently. When one wheel interacts with an irregularity in the terrain, such as a bump, the stabilizer bar may then transmit the bump force to the other wheel. Therefore, it may be beneficial to balance the stiffness of the stabilizer bar so that it reduces the vehicle body roll while not greatly hindering the independence of the wheels.

Stabilizer bars employing such principle may be constructed in several ways. For example, some stabilizer bars employ steel tube carriers, steel tube torsion elements with steel levers connected to the ends, and center brackets for mounting the stabilizer bar to the vehicle. The torsion tubes may be rigid, providing negligible torsional yield under operating conditions. Lubrication may be applied between the steel carrier and steel torsion tube.

SUMMARY

Various embodiments of variable rate stabilizer bars are disclosed, including apparatus, vehicle, and kit implementations. In one aspect, a variable rate stabilizer bar apparatus is disclosed. The apparatus may include first and second stabilizer bar members. Each stabilizer bar member may be adapted to be operatively coupled to a respective, opposite ground-engaging element of a vehicle. Each stabilizer bar member may be configured to experience a torque about their longitudinal axis upon movement of the respective ground-engaging element relative to the vehicle when operatively coupled to the ground-engaging elements. The apparatus may include a torque transfer regulator, which may be operatively coupled to both stabilizer bar members. The torque transfer regulator may be configured to transfer a portion of the torque experienced by one of the stabilizer bar members to the other stabilizer bar member. The torque transfer regulator may include a cam, which may be operatively coupled to the first stabilizer bar member and may have a first cam surface. The torque transfer regulator may include a tab and groove assembly. The tab and groove assembly may be configured to allow the cam to translate axially along the first stabilizer bar member and to impede the cam from rotating about the longitudinal axis relative to the first stabilizer bar member. The torque transfer regulator may include a first cam follower, which may be operatively coupled to the second stabilizer bar member. The first cam follower may be unable to rotate about the longitudinal axis relative to the second stabilizer bar member. The first cam follower may be adapted to interface with the first cam surface. The torque transfer regulator may include an energy source, which may be operatively coupled to at least one of the stabilizer bar members. The energy source may be configured to bias the cam toward the second stabilizer bar member.

Certain implementations may have one or more of the following advantages. Some embodiments may prevent vehicle roll during turning and provide for independent suspension during travel over rough terrain. Some embodiments may provide for active control of the degree of torque transfer from one ground-engaging element's suspension system to the other. Some embodiments may provide for easy manual adjustment of the degree of torque transfer. Some embodiments may provide multiple ways of adjusting torque transfer, allowing a vehicle operator to choose which way is most suitable in a given situation. Some embodiments may provide overload protection to prevent yielding of stabilizer bar or links. Some embodiments may provide non-linear torque reaction to resist vehicle body roll. Many different types of designs are possible, depending on application, budget, and several other factors.

BRIEF DESCRIPTION OF THE DRAWINGS

FIG. 4A shows an exploded view of an exemplary torque transfer regulator that may be used in an independent suspension system for a vehicle.

DETAILED DESCRIPTION OF ILLUSTRATIVE EMBODIMENTS

Figure 1:
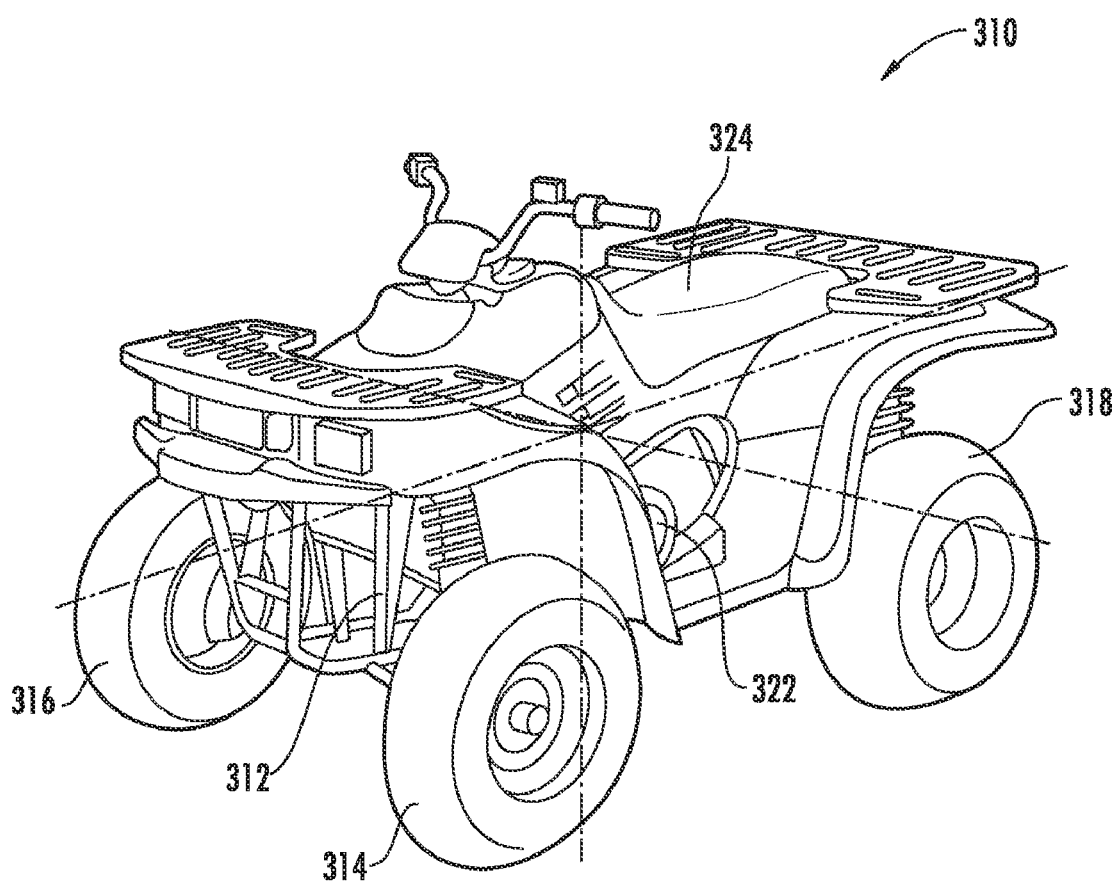
FIG. 1 shows a perspective view of an ATV.

FIG. 1 is a perspective view of an ATV 310. The ATV 310 may include a chassis 312, a left front wheel 314, a right front wheel 316, a left rear wheel 318, and a right rear wheel (not visible in FIG. 1). The ATV 310 may include an engine 322, which may be carried by the chassis 312. The engine 322 may be coupled to at least some wheels of the ATV 310 via a drive train for propelling the ATV 310. The engine 322 may be used to power each rear wheel, and in some cases, also each front wheel. The ATV 310 may include a straddle-type seat 324. In some embodiments, the ATV 310 may have a single front wheel. Although FIG. 1 illustrates only an ATV, it is to be understood that embodiments of the present invention may be implemented in or in conjunction with any other vehicle, as long as it has a pair of left and right ground-engaging elements (i.e., wheels, skis, etc.).

Figure 2:
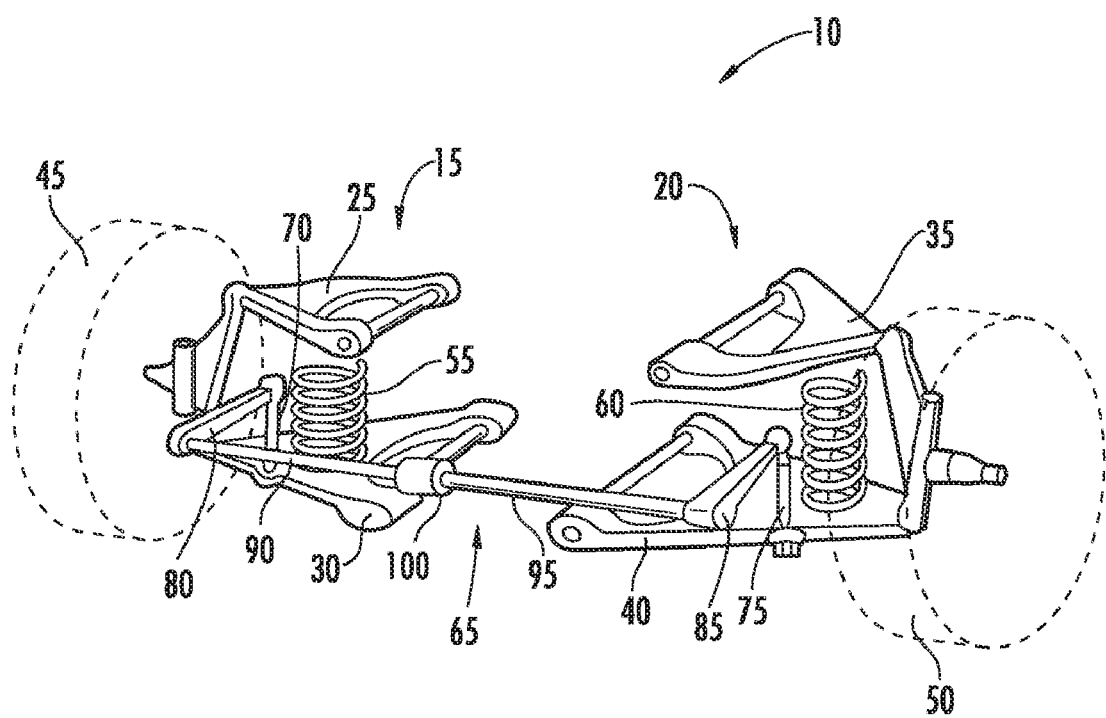
FIG. 2 shows a perspective view of an exemplary independent suspension system for a vehicle.

FIG. 2 shows an exemplary independent suspension system 10 for a vehicle. The independent suspension system 10 may include a left control mechanism 15 and a right control mechanism 20. The left control mechanism 15 may include a left upper arm 25 and a left lower arm 30, and the right control mechanism 20 may include a right upper arm 35 and a right lower arm 40. The left and right control mechanisms 15, 20 may be attached to a vehicle. The left and right control mechanisms 15, 20 may be attached to a left wheel 45 and a right wheel 50, respectively. In other embodiments, the left and right control mechanisms may be attached to other ground-engaging elements, such as a pair of skis if used in conjunction with a snowmobile. The independent suspension system 10 may include a left compression spring 55 that spans between the left upper arm 25 and the left lower arm 30 and a right compression spring 60 that spans between the right upper arm 35 and the right lower arm 40.

The independent suspension system 10 of FIG. 2 may include a stabilizer bar assembly 65. The stabilizer bar assembly 65 may include a left end link 70 to attach the stabilizer bar assembly 65 to the left lower arm 30 and a right end link 75 to attach the stabilizer bar assembly to the right lower arm 40. The stabilizer bar assembly 65 may include a left torque bar 80 to attach to the left end link 70 and a right torque bar 85 to attach to the right end link 75. The stabilizer bar assembly 65 may include a left bar segment 90 attached to the left torque bar 80 and a right bar segment 95 coupled to the right torque bar 85. The stabilizer bar assembly 65 may include a torque transfer regulator 100 that couples the left bar segment 90 and the right bar segment 95 together. Many additional types of independent suspension systems may be implemented in or in conjunction with embodiments of the present invention. Likewise, many additional types of stabilizer bar assemblies may be implemented in or in conjunction with embodiments of the present invention.

In use, when a force is exerted on one of the wheels 45, 50 during vehicle travel, the independent suspension system 10 of FIG. 2 may exert a corresponding force on the other wheel 50, 45. For example, when an upward force is exerted on the left wheel 45 due to, e.g., a bump or a turn, the left control mechanism 15 may move upward relative to the vehicle. The upward movement of the left control mechanism 15 may urge the left end link 70 upward, which may cause the corresponding end of the left torque bar 80 to move upward. The left torque bar 80 may act as a lever, exerting a torque on the left bar segment 90 approximately equal to the magnitude of the upward force exerted by the left end link 70 on the left torque bar 80 multiplied by the length of the left torque bar 80.

The torque transfer regulator 100 may determine how much of the torque that is exerted on the left bar segment 90 is transferred to the right bar segment 95. The torque that is transferred by the torque transfer regulator 100 to the right bar segment 95 may cause the right torque bar 85 to rotate upward about the right bar segment's 95 longitudinal axis. The upward rotation of the right torque bar 85 may urge the right end link 75 upward, which may urge the right control mechanism 20 upward. The upward movement of the right control mechanism 20 may exert an upward force on the right wheel 50. Thus, the independent suspension system 10 may exert on the right wheel 50 a portion of the upward force that a travel surface exerts on the left wheel 45. This example involved a force exerted by the travel surface on the left wheel 45, but the independent suspension system 10 of FIG. 2 may operate in a similar manner when a force is exerted by the travel surface on the right wheel 50. In such situations, the independent suspension system 10 may exert a corresponding force on the left wheel 45.

The torque transfer regulator 100 may transfer none, all, or a fraction of the torque from one bar segment 90, 95 to the other bar segment 95, 90. The amount of torque that the torque transfer regulator 100 transfers may be proportional to the amount of force that is exerted on the respective wheel. An example of when a high percentage of torque transfer may be desirable is during a turn. During a turn, a low percentage of torque transfer may result in swaying or rolling of the vehicle, which may prove uncomfortable for operators and may compromise vehicle safety. Transferring a high percentage of torque during a turn may provide for tighter, more responsive handling. An example of when a low percentage of torque transfer may be desirable is during travel on a bumpy surface. During travel on a bumpy surface, a high percentage of torque transfer may result in an uncomfortably bumpy ride for operators and passengers. Transferring a low percentage of torque while traveling on a bumpy surface may provide for more independent suspension, which may minimize the discomfort caused by the bumpy surface.

Figure 3A:
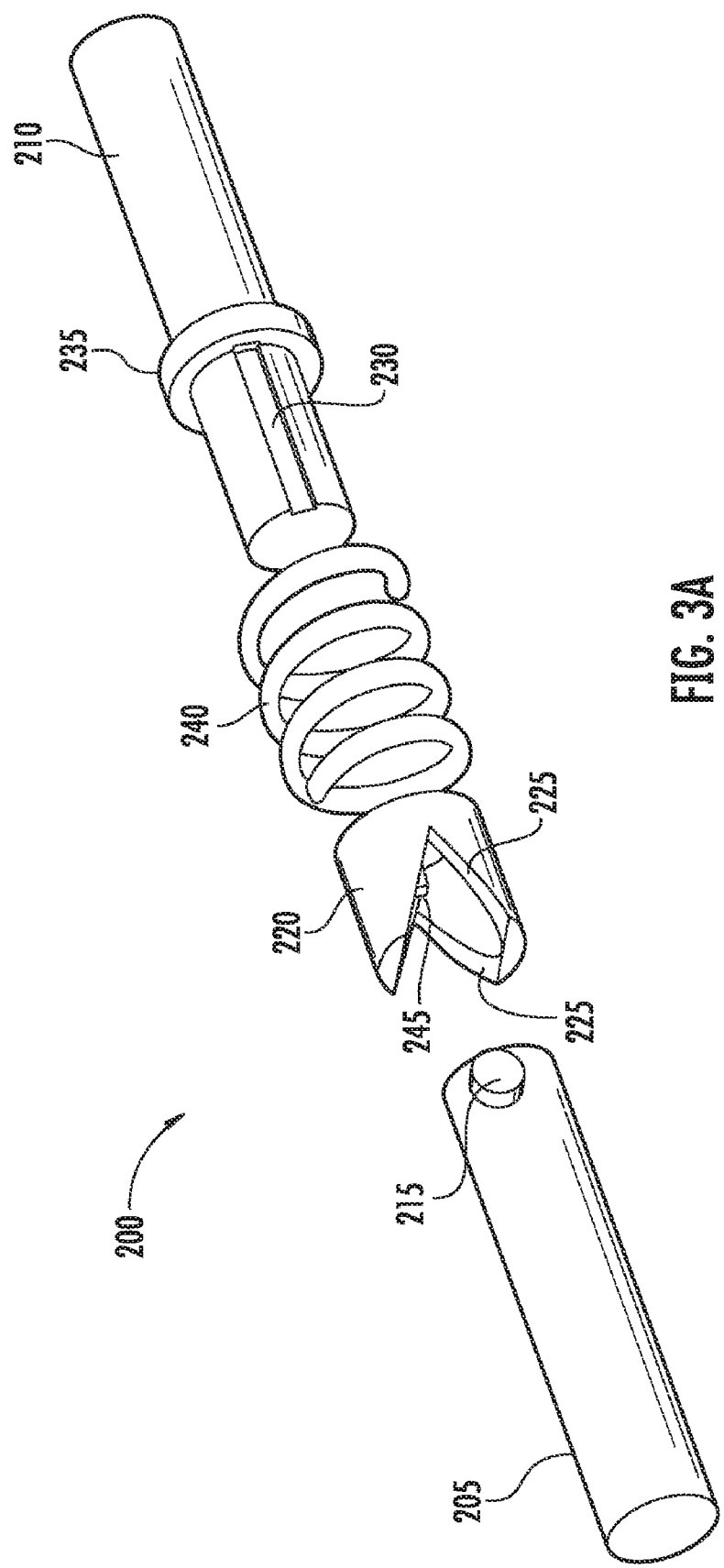
FIG. 3A shows an exploded view of an exemplary torque transfer regulator that may be used in an independent suspension system for a vehicle.
Figure 3B:
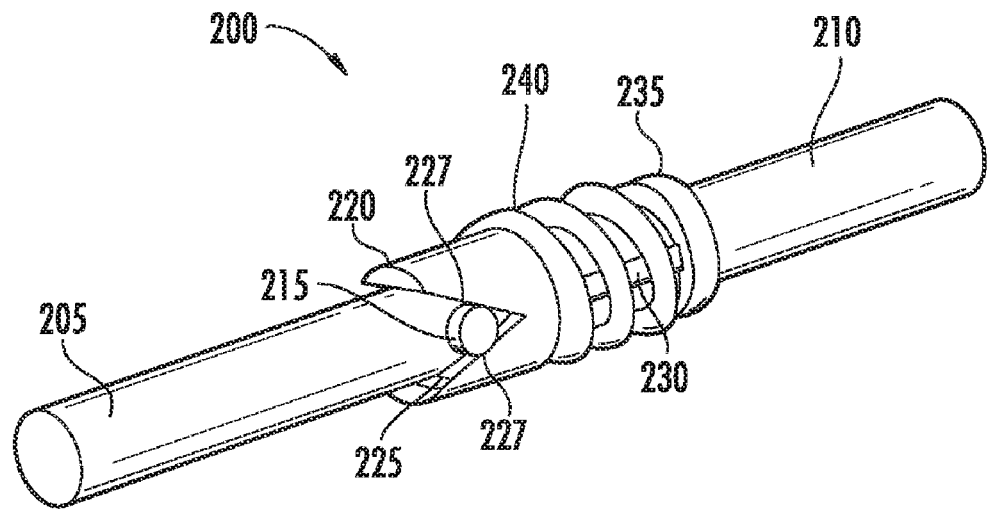
FIG. 3B shows a perspective view of the assembled torque transfer regulator of FIG. 3A.
Figure 3C:
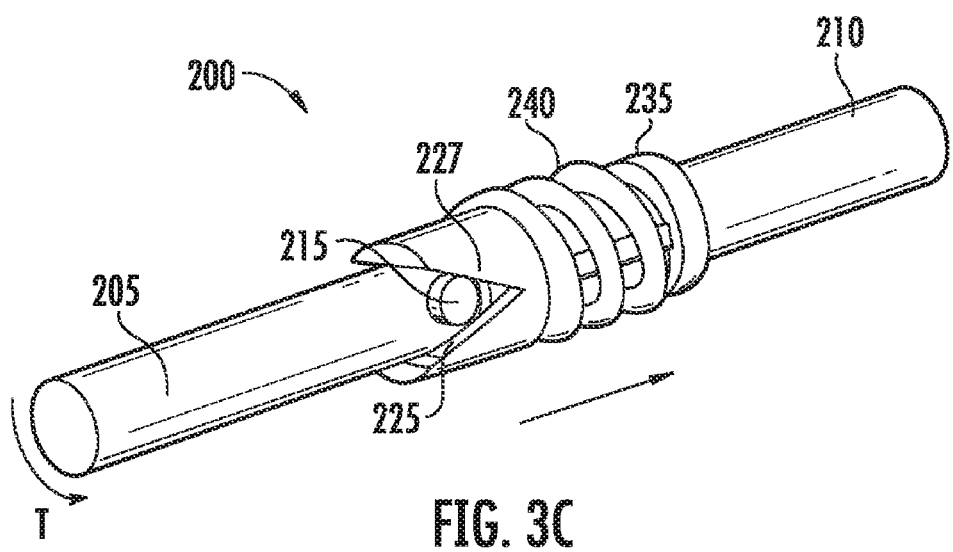
FIG. 3C shows a perspective view of the assembled torque transfer regulator of FIG. 3B in a state in which torque is applied.

FIGS. 3A-3C show a closer view of an exemplary torque transfer regulator 200 similar to that of FIG. 2. The torque transfer regulator 200 may regulate the amount of torque that is transferred between a left bar segment 205 and a right bar segment 210. The torque transfer regulator 200 may include one or more rollers 215. The rollers 215 may be coupled to the left bar segment 205. The rollers 215 may be unable to rotate about the left bar segment 205 relative to the left bar segment 205 or to translate relative to the left bar segment 205 or the right bar segment 210. The rollers 215 may rotate about axes that extend perpendicularly to a longitudinal axis of the left bar segment 205. In embodiments using two rollers 215, such as the embodiment FIGS. 3A-3C, the rollers 215 may be spaced roughly 180° apart about the left bar segment 205. In some embodiments, one roller 215 may be used. In some embodiments, multiple rollers 215 may be used and be displaced other than 180° apart (e.g., four rollers spaced 90° from one another). Embodiments may include various roller spacings, configurations, and orientations. Though the words "left" and "right" are used, the torque transfer regulator 200 may easily be oriented the opposite way (e.g., the rollers 215 may be coupled to the bar segment that attaches to either the left side or the right side of the vehicle).

In some embodiments, the left bar segment 205 and/or the right bar segment 210 may have a non-circular cross-section. In such embodiments, the cross-section of either or both bar segments may be square, oval-shaped, triangular, pentagonal, hexagonal, octagonal and so on. In some embodiments, cam and cam follower mechanisms other than those shown in FIGS. 3A-3C may be used, as long as they are able to transfer rotational motion from the left bar segment 205 to the right bar segment 210 (and vice versa) while providing means to regulate the torque transfer from one segment to the other. Examples include pin groove type mechanisms (FIGS. 4A-4C), spherical balls and a ball ramp, and/or opposing cam surfaces/pins that slide on cam surfaces without rollers.

The torque transfer regulator 200 may include a cam 220, which may interface with the rollers 215 on cam surfaces 225 at contact points 227. The cam 220 may be cylindrical. In some embodiments, the cam 220 may be a non-cylindrical cam, such that the radius between the roller axes and where the contact points interact with the cam surfaces varies, thus allowing for various torque transfer profiles without altering the cam 220. The cam surfaces 225 may be configured to allow the rollers 215 to roll along them, thereby changing the locations of the contact points 227 as shown in FIG. 3C. The cam 220 may include one cam surface 225 for each roller 215. The cam 220 may be coupled to the right bar segment 210 via an assembly comprising tab 245 and groove 230. The tab 245 may slide within groove 230 to allow the cam 220 to translate relative to the right bar segment 210 along the right bar segment's 210 longitudinal axis. In some embodiments, the groove 230 may be curved to impede the cam 220 from rotating about the right bar segment's 210 longitudinal axis relative to the right bar segment 210 during such translation. In some embodiments, the groove 230 may be positioned parallel to the right bar segment's longitudinal axis, as depicted in FIGS. 3A-3B, to prevent (i.e., to completely impede) the cam 220 from rotating about the right bar segment's 210 longitudinal axis relative to the right bar segment 210 during such translation. In some embodiments, the groove 230 may be positioned on the cam 220 and the tab 245 may be located on either the right bar segment 210 or left bar segment 205. In some embodiments, a right bar segment having a non-circular cross-section (e.g., a square cross-section), as disclosed above, may allow the cam 220 to translate relative to the right bar segment along the right bar segment's longitudinal axis. In such embodiments, the cam 220 may be unable to rotate about the longitudinal axis relative to the right bar segment because of the right bar segment's non-circular cross section. It should be understood that the cam 220 may have any cross-sectional geometry (cylindrical, square, triangular, etc.), as long as the rollers 215 are able to follow cam surface 225.

The torque transfer regulator 200 of FIGS. 3A-3C may include a stop 235 and a spring 240 to urge the rollers 215 and the cam surfaces 225 together. In some embodiments, such as in FIGS. 3A-3C, the stop 235 may be integral with right bar segment 235 and may be positioned farther from, or closer to, the cam 220. The positioning of the stop 235 may impact the force exerted by the rollers 215 on the cam surfaces 225 and vice versa. The spring 240 of the torque transfer regulator 200 may be replaced by, or used in combination with, other suitable energy sources capable of exerting a biasing force. Examples include coil springs, Belleville washers, wave springs, a linear spring, hydraulic pressure, and other suitable energy sources. Springs with varying spring constants may be used. The selection of a spring, with a particular spring constant may impact the amount of torque that is transferred from one bar segment to the other. Multiple springs 240 may be provided, as shown in FIGS. 3A-3C, allowing a user to choose the amount of stiffness torque regulator 200 provides. For example, a user may choose a stiffer spring for one day's outing that will involve a large amount of tight turning and may choose a less stiff spring for the next day's outing that will involve a large amount of travel over rough terrain. The springs may be interchanged by disassembling the torque transfer regulator (e.g., removing the right or left bar segment) or by other suitable methods.

In use, as torque is applied to either of the bar segments 205, 210, the torque transfer regulator 200 may transfer none, all, or a fraction of that torque to the other bar segment 210, 205. For example, FIG. 3C shows the torque transfer regulator 200 in which torque is applied to the left bar segment 205, and thereby to the roller 215, in a direction T. The torque may cause the rollers 215 to rotate about the longitudinal axis relative to the cam 220 and may cause the cam 220 to translate axially relative to the right bar segment 210. The torque may be resisted by the cam 220. The extent to which the cam 220 resists the torque may be proportional to the amount of torque that is transferred from the left bar segment 205 to the right bar segment 210.

Figure 4B:
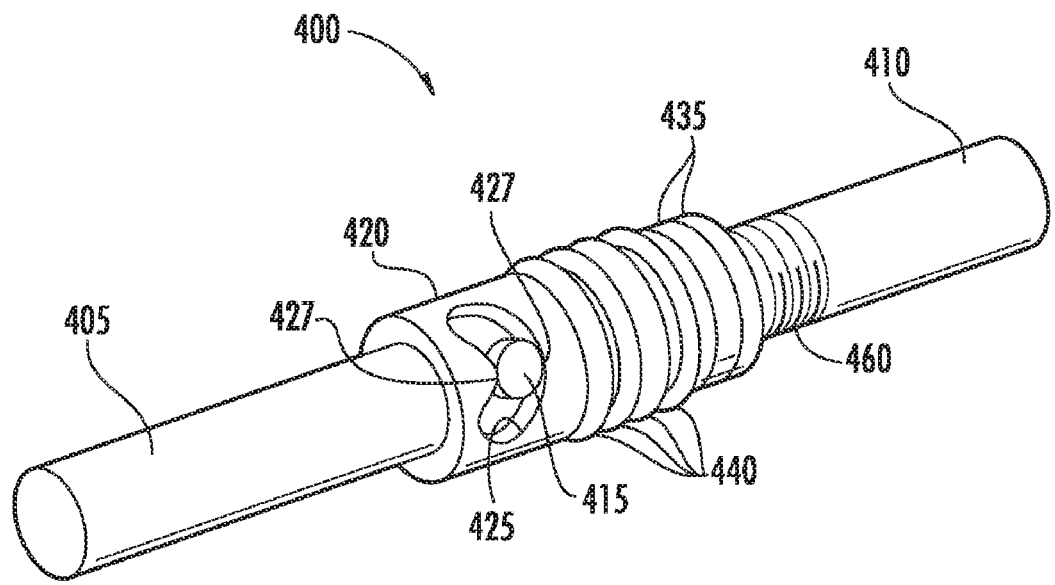
FIG. 4B shows a perspective view of the assembled torque transfer regulator of FIG. 4A.
Figure 4C:
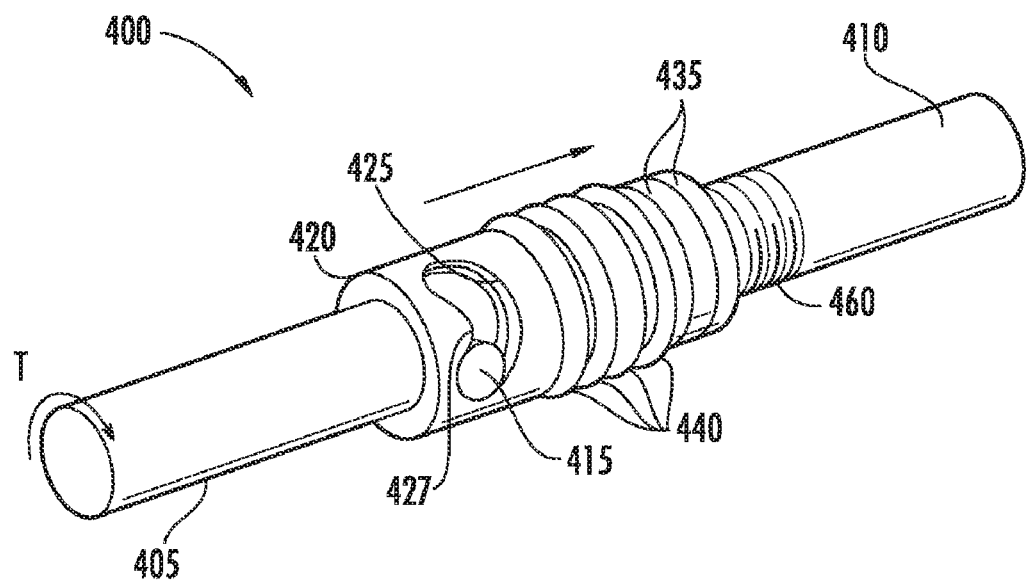
FIG. 4C shows a perspective view of the assembled torque transfer regulator of FIG. 4B in a state in which torque is applied.

FIGS. 4A-4C show a closer view of a second exemplary torque transfer regulator 400 similar to that of FIG. 2. The torque transfer regulator 400 may regulate the amount of torque that is transferred between a left bar segment 405 and a right bar segment 410. The torque transfer regulator 400 may include one or more rollers 415. The rollers 415 may be coupled to the left bar segment 405 by inserting a shaft 450 through hole 455. The shaft 450 may be integral with one of the rollers 415 or be a separate entity to which the rollers 415 connect. The rollers 415 may be unable to rotate about the left bar segment 405 relative to the left bar segment 405 or to translate relative to the left bar segment 405 or the right bar segment 410. The rollers 415 may rotate about axes that extend perpendicularly to a longitudinal axis of the left bar segment 405. In embodiments using two rollers 415, such as the embodiment FIGS. 4A-4C, the rollers 415 may be spaced roughly 180° apart about the left bar segment 405. In some embodiments, one roller 415 may be used. In some embodiments, multiple rollers 415 may be used and be displaced other than 180° apart (e.g., four rollers spaced 90° from one another). Embodiments may include various roller spacings, configurations, and orientations. Though the words "left" and "right" are used, the torque transfer regulator 400 may easily be oriented the opposite way (e.g., the rollers 415 may be coupled to the bar segment that attaches to either the left side or the right side of the vehicle).

The torque transfer regulator 400 may include a cam 420, which may interface with the rollers 415 on slot 425 at contact points 427. The slot 425 may be configured to allow the rollers 415 to roll along them, thereby changing the locations of the contact points 427, as shown in FIG. 4C. The cam 420 may include one slot 425 for each roller 415. The cam 420 may be coupled to the right bar segment 410 via an assembly comprising a tab and a groove 430. The tab may slide within the groove 430 to allow the cam 420 to translate relative to the right bar segment 410 along the right bar segment's 410 longitudinal axis. In some embodiments, the groove 430 may be curved to impede the cam 420 from rotating about the right bar segment's 410 longitudinal axis relative to the right bar segment 210 during such translation. In some embodiments, the groove 430 may be straight, as depicted in FIG. 4A, to prevent (i.e., to completely impede) the cam 420 from rotating about the right bar segment's 410 longitudinal axis relative to the right bar segment 410 during such translation. In some embodiments, the groove 430 may be positioned on the cam 420, and the tab may be located on either the right bar segment 410 or left bar segment 405. In some embodiments, a right bar segment having a non-circular cross-section (e.g., a square cross-section), as disclosed above, may allow the cam 420 to translate relative to the right bar segment along the right bar segment's longitudinal axis. In such embodiments, the cam 420 may be unable to rotate about the longitudinal axis relative to the right bar segment because of the right bar segment's non-circular cross section. It should be understood that the cam 420 may have any cross-sectional geometry (cylindrical, square, triangular, etc.), as long as the rollers 415 are able to follow slot 425.

In some embodiments, the left bar segment 405 and/or the right bar segment 410 may have a non-circular cross-section. In such embodiments, the cross-section of either or both bar segments may be square, oval-shaped, triangular, pentagonal, hexagonal, octagonal and so on. Many mechanisms apart from a cam 420 and rollers 415 may be used, as long as they are able to transfer rotational motion from the left bar segment 205 to the right bar segment 210 (and vice versa) while providing means to regulate the torque transfer from one segment to the other.

The torque transfer regulator 400 of FIGS. 4A-4C may include stops 435 and Belleville washers 440 to bias the rollers 415 back to the central portion of slot 425. In some embodiments, such as in FIGS. 4A-4C, the position of the stops 435 may be adjusted manually. In such embodiments, an operator may position the stops 435 farther from, or closer to, the cam 420 by screwing or unscrewing the stops 435 along the threaded portion 460 of the right bar segment 410. The positioning of the stops 435 may impact the force exerted by the rollers 415 on the slot 425 and vice versa. In some embodiments, the position of the stop 435 may be adjusted manually by equivalent means (e.g., cam lock, lead screw, etc.). In such embodiments, the stop 435 may be locked into a desired set position manually by the operator to achieve a predetermined amount of pre-load. In some embodiments, the position of the stop 435 may be adjusted automatically by an actuator (e.g., hydraulic actuator, electric motor, etc.). In such embodiments, the amount of pre-load on the Belleville washers 440 may be set to a fixed position or controlled actively based on one or more parameters perceived by a vehicle during use. Therefore, the amount of vehicle roll resistance may be actively controlled based on vehicle inputs, such as, but not limited to vehicle roll, lateral acceleration, speed, steer angle, shock travel and shock velocity. For example, in one embodiment, the pre-load may be increased as lateral acceleration increases. In another embodiment, pre-load may decrease with high shock velocity or shock pressure experienced during a bump event.

The Belleville washers 440 of the torque transfer regulator 400 may be replaced by, or used in combination with, other suitable energy sources capable of exerting a biasing force. Examples include coil springs, wave springs, a linear spring, hydraulic pressure, and other suitable energy sources. Springs with varying spring constants may be used. The selection of an energy source, such as a Belleville washer, with a particular spring constant may impact the amount of torque that is transferred from one bar segment to the other. Multiple Belleville washers 440 may be provided, as shown in FIGS. 4A-4C, allowing a user to choose the amount of stiffness the torque transfer regulator 400 provides. For example, a user may choose multiple Belleville washers for one day's outing that will involve a large amount of tight turning and may choose only one Belleville washer for the next day's outing that will involve a large amount of travel over rough terrain. The Belleville washers may be interchanged by disassembling the torque transfer regulator 400 (e.g., loosening the stops 435, removing the rollers 415, sliding the cam 420 along left bar segment 405, and adding or subtracting the Belleville washers 440).

In use, as torque is applied to either of the bar segments 405, 410, the torque transfer regulator 400 may transfer none, all, or a fraction of that torque to the other bar segment 410, 405. For example, FIG. 4C shows the torque transfer regulator 400 in which torque is applied to the left bar segment 405, and thereby to the roller 415, in a direction T. The torque may cause the rollers 415 to rotate about the longitudinal axis relative to the cam 420 and may cause the cam 420 to translate axially relative to the right bar segment 410. The torque may be resisted by the cam 420. The extent to which the cam 420 resists the torque may be proportional to the amount of torque that is transferred from the left bar segment 405 to the right bar segment 410.

Figure 5A:
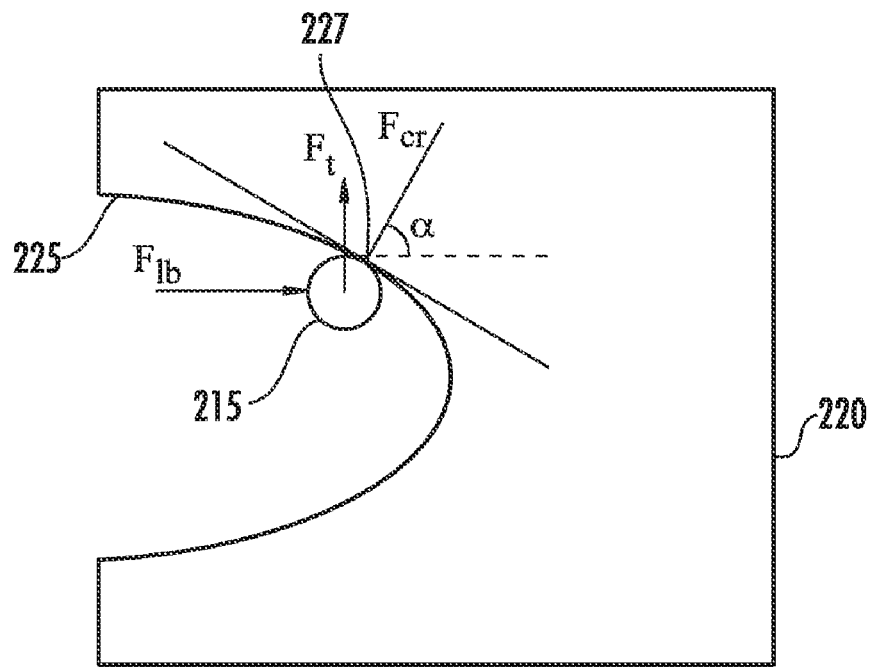
FIG. 5A shows a free body diagram of the forces exerted on a roller of the torque transfer regulator of FIGS. 3A-3C when torque is applied to the left bar segment.

FIG. 5A provides a free body diagram of the forces exerted on a roller 215 of FIGS. 3A-3C when torque is applied to the left bar segment 205 and the cam 220 provides a resistive force. In FIG. 5A, $F_\tau$ may be the force component of the torque being exerted on the left bar segment. $F_\tau$ may be approximately equal to the torque applied to the left bar segment 205 divided by the distance from the left bar segment's 205 longitudinal axis to the contact point 227. $F_{cr}$ may be a force applied by the cam 220. $F_{cr}$ may act in a direction perpendicular to a line that is tangent to the roller 215 and the cam surface 225 and that passes through the contact point 227. The direction in which $F_{cr}$ acts may make an angle $\alpha$ with the longitudinal axis. The resistive component of $F_{cr}$ may be the component that acts in the opposite direction of $F_\tau$, which may be equal to $F_{cr}$ multiplied by the sine of angle $\alpha$. Resolving the forces in the rotational direction may produce the following formula:

$$F_\tau = F_{cr}\sin(\alpha) + [\text{rotation of the roller relative to the cam}].$$

The rotation of the roller 215 relative to the cam 220 may result in torque being absorbed rather than transferred. Accordingly, the greater the resistive component of $F_{cr}$ (i.e., the greater $F_{cr}\sin(\alpha)$), the greater proportion of torque may be transferred from the left bar segment to the right bar segment. Conversely, the lesser the resistive component of $F_{cr}$, the lesser proportion of torque may be transferred and greater proportion of torque may be absorbed.

Figure 5B:
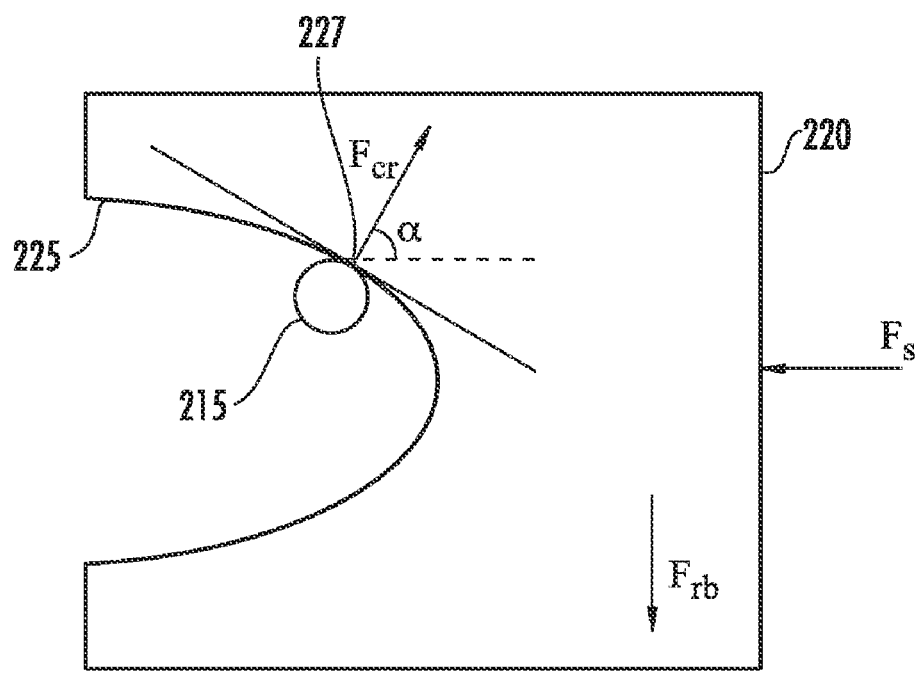
FIG. 5B shows a free body diagram of the forces exerted on a cam of the torque transfer regulator of FIGS. 3A-3C when torque is applied to the left bar segment.

FIG. 5B provides a free body diagram of the forces exerted on the cam 220 of FIGS. 3A-3C when torque is applied to the left bar segment 205. In FIG. 5B, $F_{cr}$ may be the same force as discussed in the previous paragraph that acts between the cam 220 and the roller 215. $F_{cr}$ may act on the cam 220 in the opposite direction as $F_{cr}$ acts on the roller 215 in FIG. 5A. Referring again to FIG. 5B, $F_s$ may be a spring force acting on the cam 220. $F_s$ may be approximately equal to the spring constant (k) multiplied by the distance that the spring is compressed from its relaxed state (x). In other words, $F_s$ may be approximately equal to kx. Resolving the forces in the axial direction may produce the following formula:

$$F_{cr}\cos(\alpha)=F_s=kx.$$

Solving for $F_{cr}$ produces:

$$F_{cr}=(kx)/\cos(\alpha).$$

Solving for $F_{cr}$ produces:

$$F_{cr}=(kx)/\cos(\alpha).$$

Knowing $F_{cr}$, the force that provides resistance to the torque exerted on the left bar segment may be calculated. $F_{cr}$, as calculated in connection with FIG. 5B may be inserted into the formula associated with FIG. 5A, producing:

$$F_\tau=(kx/\cos(\alpha))\sin(\alpha)+[\text{rotation of the roller relative to the cam}].$$

Simplifying produces:

$$F_\tau=(kx)\tan(\alpha)+[\text{rotation of the roller relative to the cam}].$$

Thus, the force that provides resistance to $F_\tau$ may be approximately equal to $(kx)\tan(\alpha)$.

Figure 6:
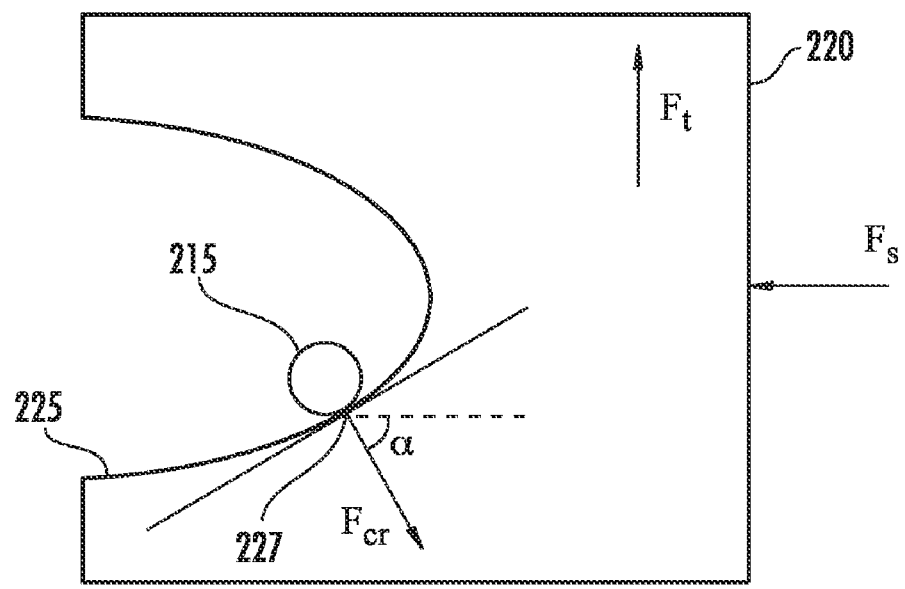
FIG. 6 shows a free body diagram of the forces exerted on a cam of the torque transfer regulator of FIGS. 3A-3C when torque is applied to the right bar segment.

FIG. 6 shows how the same may hold true when torque is applied to the right bar segment. FIG. 6 provides a free body diagram of the forces exerted on a cam 220 of FIGS. 3A and 3B when torque is applied to the right bar segment 210 and a roller 215 provides a resistive force. In FIG. 6, $F_\tau$ may be the force component of the torque being exerted on the right bar segment. $F_\tau$ may be approximately equal to the torque applied to the right bar segment divided by the distance from the right bar segment's longitudinal axis to the contact point 227. $F_{cr}$ may be a force applied by the roller 215. $F_{cr}$ may act in a direction perpendicular to a line that is tangent to the roller 215 and the cam surface 225 and that passes through the contact point 227. The direction in which $F_{cr}$ acts may make an angle a with the longitudinal axis. The resistive component of $F_{cr}$ may be the component that acts in the opposite direction of $F_\tau$, which may be equal to $F_{cr}$ multiplied by the sine of angle α. Resolving the forces in the rotational direction may produce the following formula:

$$F_\tau=F_{cr}\sin(\alpha)+[\text{rotation of the cam relative to the roller}].$$

The rotation of the cam 220 relative to the roller 215 may result in torque being absorbed rather than transferred. Accordingly, the greater the resistive component of $F_{cr}$ (i.e., the greater $F_{cr}\sin(\alpha)$), the greater proportion of torque may be transferred from the left bar segment to the right bar segment. Conversely, the lesser the resistive component of $F_{cr}$, the lesser proportion of torque may be transferred and greater proportion of torque may be absorbed.

Finding $F_{cr}$ involves a similar process as described in connection with FIG. 5B. Referring to FIG. 6, $F_s$ may be a spring force acting on the cam 220, which may be approximately equal to the spring constant (k) multiplied by the distance that the spring is compressed from its relaxed state (x). Put another way, $F_s$ may be approximately equal to kx. Resolving the forces in the axial direction may produce the following formula:

$$F_{cr}\cos(\alpha)=F_s=kx.$$

Solving for $F_{cr}$ produces:

$$F_{cr}=(kx)/\cos(\alpha).$$

Knowing $F_{cr}$, the force that provides resistance to the torque exerted on the right bar segment may be calculated. $F_{cr}$ may be inserted into the rotational direction formula, producing:

$$F_\tau=(kx/\cos(\alpha))\sin(\alpha)+[\text{rotation of the cam relative to the roller}].$$

Simplifying produces:

$$F_\tau=(kx)\tan(\alpha)+[\text{rotation of the cam relative to the roller}].$$

Thus, whether torque is applied to the cam side of the torque transfer regulator or to the cam follower side, the force that provides resistance to $F_\tau$ may be approximately equal to $(kx)\tan(\alpha)$.

From the preceding formula (resistive force equals approximately $(kx)\tan(\alpha)$), it may follow that three variables may impact the resistive force. In some embodiments, the spring constant (k) may be varied while keeping the pre-load (x) and the cam angle (α) constant, thereby producing a varied resistive force. In some embodiments, the pre-load (x) may be varied while keeping the spring constant (k) and the cam angle (α) constant, thereby producing a varied resistive force. In some embodiments, the cam angle (α) may be varied while keeping the spring constant (k) and the pre-load (x) constant, thereby producing a varied resistive force. It should be understood that combinations of varying the spring constant (k), pre-load (x), and cam angle (α) may produce a varied resistive force. It should also be understood that the resistive torque may be varied by other methods, such as by altering the geometry of the mechanism as discussed previously (e.g., altering the distance from the left bar segment's 205 longitudinal axis to the contact point 227).

Figure 7A:
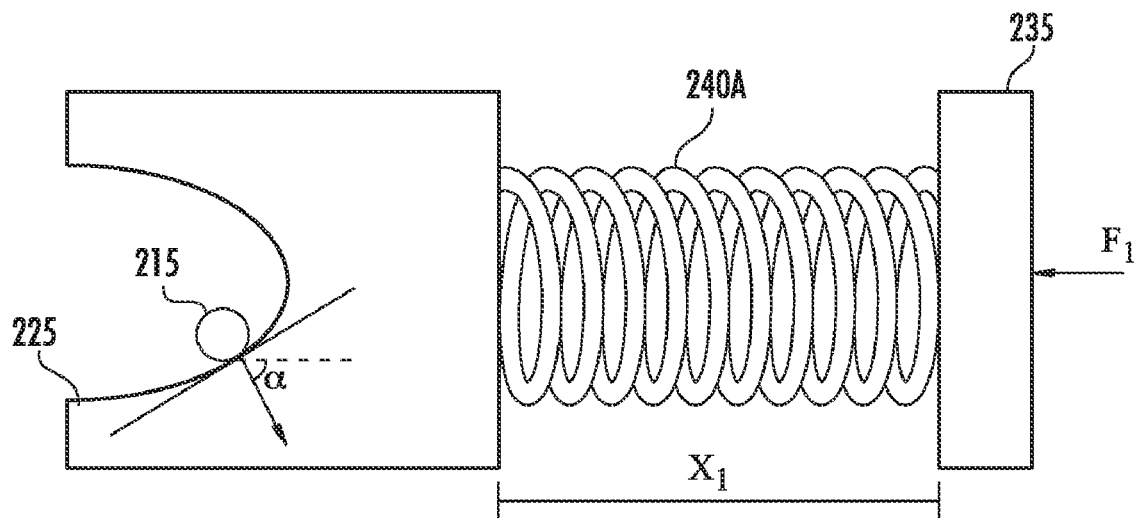
FIG. 7A shows a schematic side view of components of the torque transfer regulator of FIGS. 3A-3C having a spring with a relatively high spring constant.
Figure 7B:
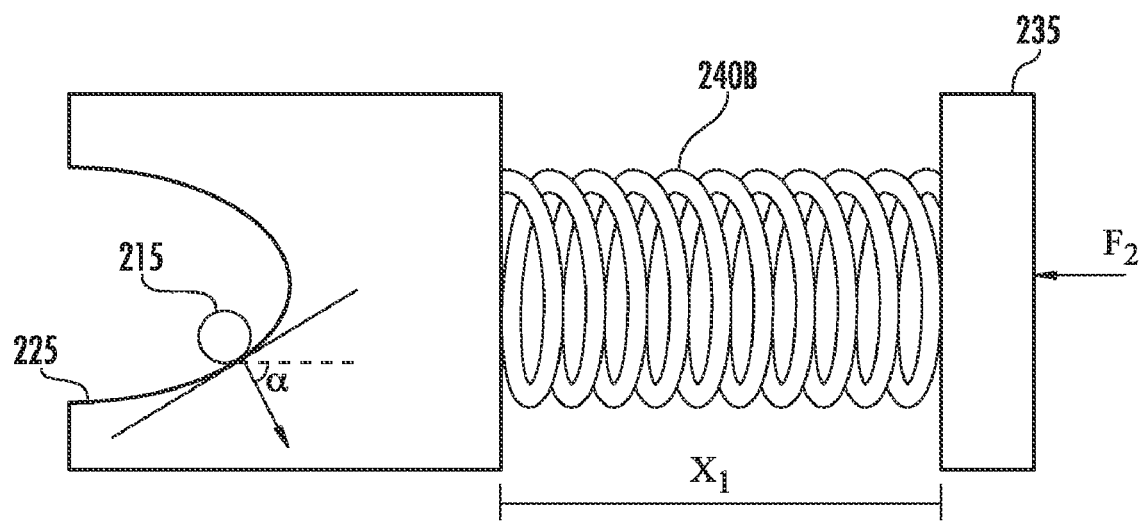
FIG. 7B shows a schematic side view of components of the torque transfer regulator of FIGS. 3A-3C having a spring with a relatively low spring constant.

FIGS. 7A and 7B illustrate how varying the spring constant (k), while keeping the pre-load (x) and the cam angle (α) constant may impact the resistive force $((kx)\tan(\alpha))$, thereby impacting how much torque is transferred from one bar segment to the other. FIGS. 7A and 7B show side schematic views of a roller 215 on a cam surface 225, a spring 240A, 240B, and a stop 235, all of which may be similar to corresponding components in FIGS. 3A-3C. The spring 240A of FIG. 7A may be relatively stiff—i.e., it may have a relatively high spring constant. The spring 240B of FIG. 7B may be relatively loose—i.e., it may have a relatively low spring constant. The pre-load ($x_1$) and the cam angle (α) are the same in FIGS. 7A and 7B. Because the resistive force $((kx)\tan(\alpha))$ is directly proportional to the spring constant, the embodiment of FIG. 7A may produce a greater resistive force than the embodiment of FIG. 7B. Accordingly, the embodiment of FIG. 7A may provide for a greater proportion of torque transfer than the embodiment of FIG. 7B. In situations in which greater torque transfer is desired (e.g., rides involving large amounts of high-speed turning) a spring with a higher spring constant may be implemented. In situations in which less torque transfer is desired (e.g., rides over bumpy terrain), a spring with a lower spring constant may be implemented.

Figure 8A:
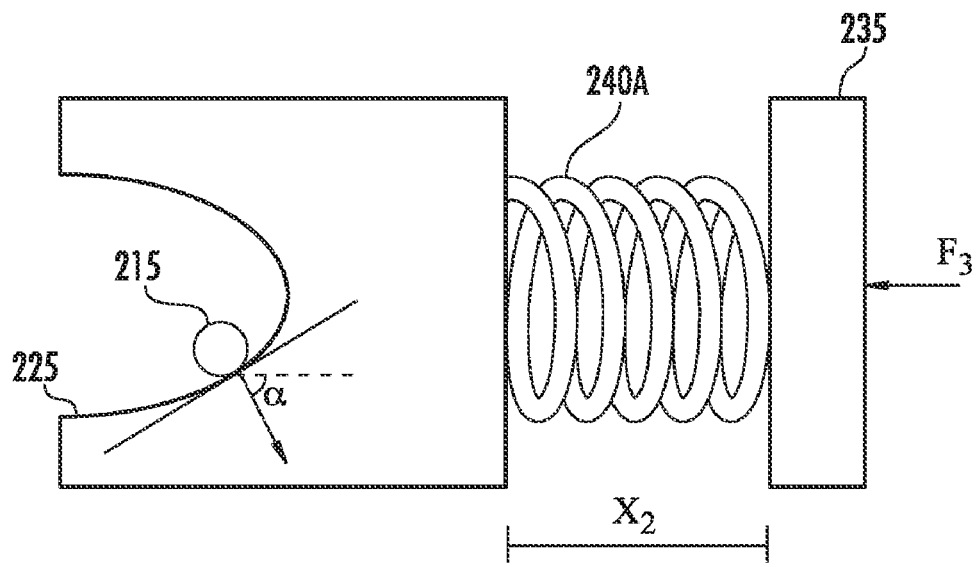
FIG. 8A shows a schematic side view of components of the torque transfer regulator of FIG. 7A having relatively large pre-load.
Figure 8B:
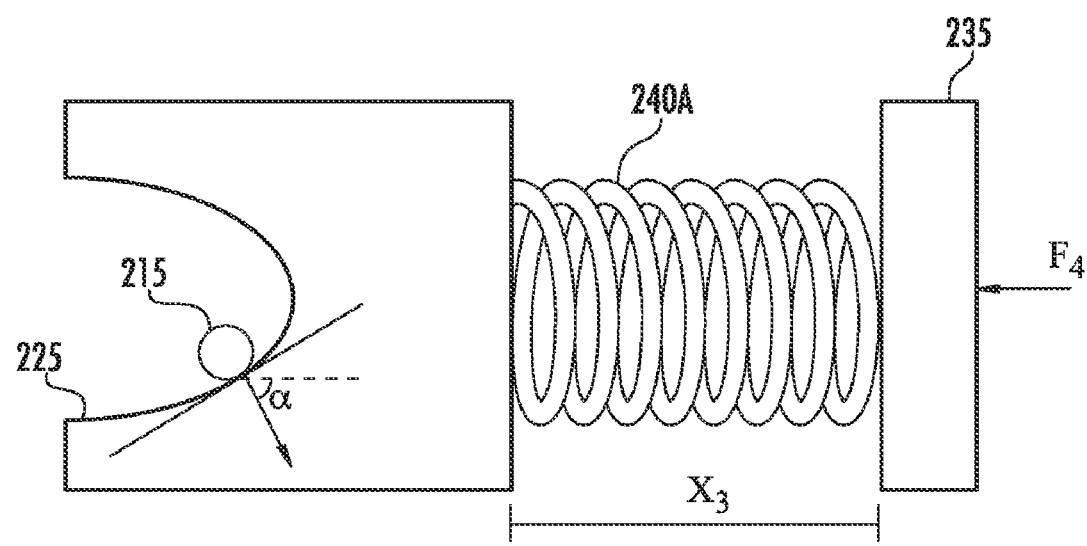
FIG. 8B shows a schematic side view of components of the torque transfer regulator of FIG. 7A having relatively small pre-load.

FIGS. 8A and 8B illustrate how varying the pre-load ($x_2$ & $x_3$), while keeping the spring constant (k) and the cam angle (α) constant, may impact the resistive force $((kx)\tan(\alpha))$, thereby impacting how much torque is transferred from one bar segment to the other. FIGS. 8A and 8B show side schematic views of a roller 215 on a cam surface 225, a spring 240A, and a stop 235, all of which may be similar to corresponding components of FIGS. 3A-3C. Both FIGS. 8A and 8B show the spring 240A and the stop 235 in a pre-loaded state as compared to that of FIG. 7A, which shows the spring 240A is in a more relaxed state. The amount the spring 240A is pre-loaded in FIG. 8A may be larger than the amount the spring is pre-loaded in FIG. 8B. The spring constant (k) and the cam angle (α) are the same in FIGS. 8A and 8B. Because the resistive force ((kx) tan (α)) is directly proportional to the amount the spring 240 is pre-loaded, the embodiment of FIG. 8A may produce a greater resistive force than the embodiment of FIG. 8B. Accordingly, the embodiment of FIG. 8A may provide for a greater proportion of torque transfer than the embodiment of FIG. 8B. In situations in which greater torque transfer is desired (e.g., rides involving large amounts of high-speed turning) the stop 235 may be positioned closer to the cam 220. In situations in which less torque transfer is desired (e.g., rides over bumpy terrain), the stop 235 may be positioned farther from the cam 220. In some embodiments, the positioning of the stop 235 may be adjusted automatically. In such embodiments, the positioning of the stop 235 may be adjusted based on one or more parameters perceived by a vehicle during use, such as acceleration or vehicle roll. Therefore, the amount of vehicle roll resistance may be actively controlled based on vehicle inputs, such as, but not limited to vehicle roll, lateral acceleration, speed, steer angle, shock travel and shock velocity. For example, in one embodiment, the pre-load may be increased as lateral acceleration increases. In another embodiment, pre-load may decrease with high shock velocity or shock pressure experienced during a bump event.

Figure 9:
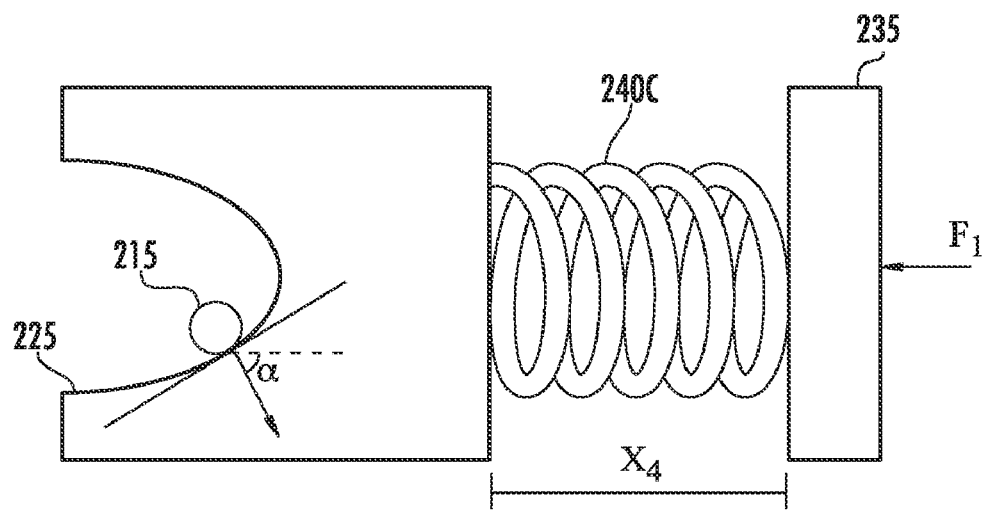
FIG. 9 shows a schematic side view of components of the torque transfer regulator of FIGS. 3A-3C having a spring with a relatively low spring constant and having relatively large pre-load as compared to FIG. 7A.

FIG. 9 illustrates how varying both the pre-load (x) and the spring constant (k), while keeping the cam angle (α) constant, may also impact the resistive force ((kx)tan(α)), thereby impacting how much torque is transferred from one bar segment to the other. FIG. 9 shows a side schematic view of a roller 215 on cam surface 225, a spring 240C, and a stop 235, all of which may be similar to corresponding components of FIGS. 3A-3C. The spring constant (k) of spring 240C may differ from that of spring 240A (see FIG. 7A). Adjusting the pre-load ($x_2$) and the elasticity of the spring may provide for even greater proportion of torque transfer than only varying one of the pre-load and spring constant.

Figure 10:
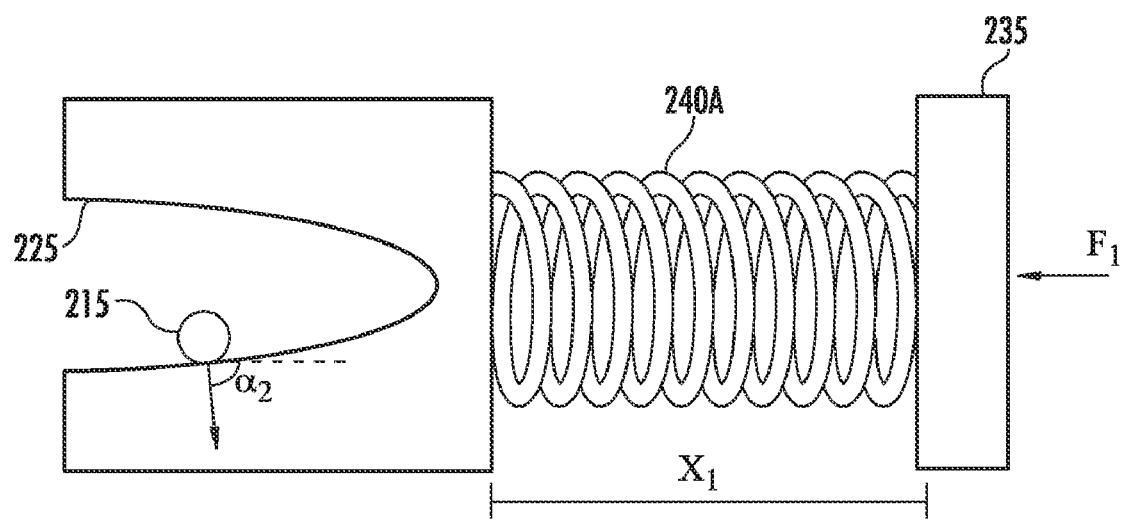
FIG. 10 shows a schematic side view of components of the torque transfer regulator of FIGS. 3A-3C having a cam with a relatively large cam angle as compared to FIG. 7A.

FIG. 10 illustrates how varying the cam angle (α), while keeping the spring constant (k) and the pre-load (x) constant, may impact the resistive force ((kx)tan(α)), thereby impacting how much torque is transferred from one bar segment to the other. FIG. 10 shows a side schematic view of a roller 215 on a cam surface 225, a spring 240A, and a stop 235, all of which may be similar to corresponding components in FIGS. 3A and 3B. The cam angle ($α_2$) of FIG. 10 may be relatively large, while the cam angle (α) of FIG. 7A may be relatively small. The spring constant (k) and the pre-load (x) may be the same in FIGS. 7A and 10. Because the resistive force ((kx) tan(α)) is directly proportional to the tangent of the cam angle (α), and because the tangent of a relatively large angle is greater than the tangent of a relatively small angle, the embodiment of FIG. 10 may produce greater resistive force than the embodiment of FIG. 7A. Accordingly, the embodiment of FIG. 10 may provide for a greater proportion of torque transfer than the embodiment of FIG. 7A. In situations in which greater torque transfer is desired (e.g., rides involving large amounts of high-speed turning) a cam with a relatively gradual slope may be implemented. In situations in which less torque transfer is desired (e.g., rides over bumpy terrain), a cam with a relatively steep slope may be implemented. A cam having a cam surface that is generally linear may provide for an approximately constant percentage of torque transfer at all points as the roller rolls along the cam surface. This may be owed to the fact that the cam angle (α), and thus the tangent of α, may be approximately constant at all points as the roller rolls along the cam surface, thereby providing an approximately constant resistive force. A cam having a cam surface that is non-linear may provide for a varying percentage of torque transfer as the roller rolls along the cam surface. This may be owed to the fact that the cam angle (α), and thus the tangent of α, may vary as the roller rolls along the cam surface, thereby providing a varying resistive force.

Figure 11:
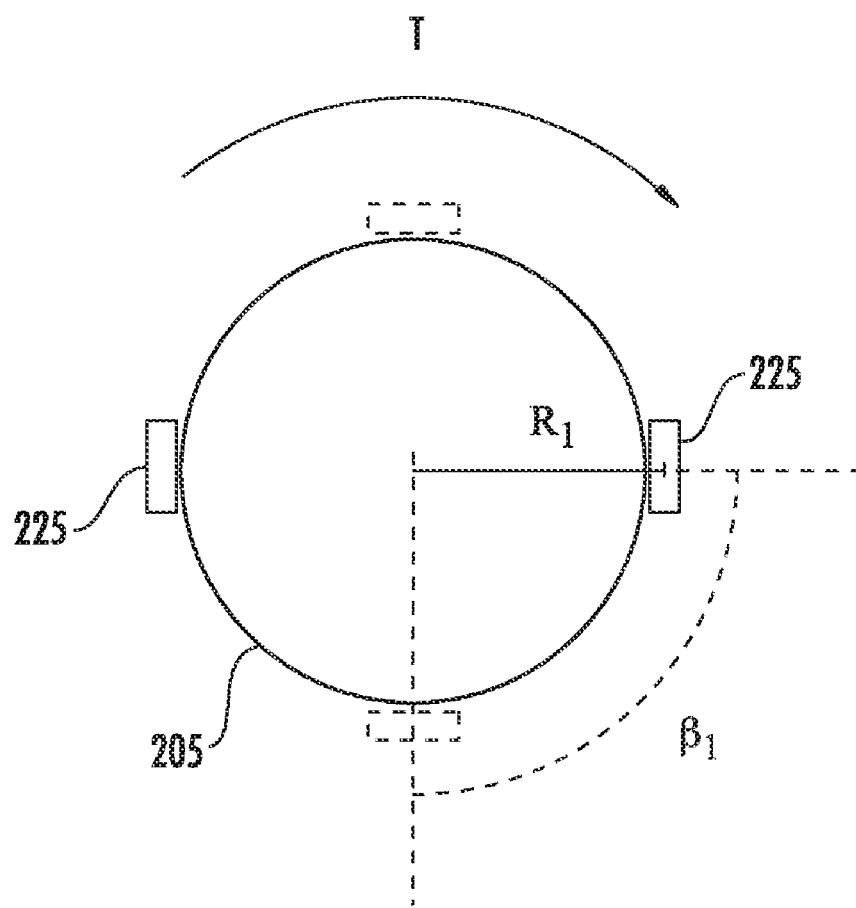
FIG. 11 shows an end view of left bar segment of the torque transfer regulator of FIGS. 3A-3C.

FIG. 11 shows an end view of the left bar segment 205 of the torque transfer regulator 200 of FIGS. 3A-3C. When a torque is applied to the left bar segment 205, the left bar segment 205 may rotate an angle ($β_1$). When a torque is transferred through the torque transfer regulator 200 to the right bar segment 210, the right bar segment 210 rotates an angle ($β_2$) (not shown). The twist angle ($β_t$) (not shown) is the difference between the rotation of angle ($β_1$) of the left bar segment 205 and the rotation of angle ($β_2$) of the right bar segment 210. The twist angle ($β_t$) is dependent upon the radius ($R_1$) of the left bar segment 205, the radius ($R_2$) of the right bar segment 210, the pre-load (x) of the spring, and the angle of the cam (α). Assuming that the radii of left bar segment 205 and the right bar segment 210 are the same, the twist angle ($β_t$) may be calculated by using the following equation:

$$β_t = x/R \tan(α)$$

Since torque is equal to the cross product of the resistive force ($F_τ$) and the distance of resistive force ($F_τ$) from the fulcrum, that is the distance (R) from the left bar segment's 205 longitudinal axis to the contact point 227, the torque may be calculated by the following equation since the force is perpendicular to the distance:

$$T = R(F_τ)$$

From our earlier calculations, we know that the resistive force is equivalent to (kx)tan(α). Therefore substituting for ($F_τ$) yields:

$$T = R(kx)\tan(α).$$

Solving for x from our twist angle equation:

$$x = β_t R \tan(α)$$

Therefore, the pre-load (x) or displacement of the spring from the relaxed position within the torque transfer regulator 200 may be attributed to the distance of the distance of resistive force ($F_τ$) from the fulcrum, the twist angle ($β_t$) that compares the rotation of the left bar segment 205 relative to the right bar segment 210, and the cam angle (α).

Therefore substituting for (x) into our torque equation yields:

$$T = R(k(β_t R \tan(α))\tan(α)$$

Simplifying:

$$T = k β_t R^2 (\tan(α))^2$$

Therefore, the torque transfer between the left bar segment 205 and the right bar segment 210 may be varied by altering the spring constant (k), the angle ($β_1$) of the left bar segment, the angle ($β_2$) of the left bar segment, the distance (R) of the resistive force ($F_τ$) from the fulcrum, and/or the cam angle (α).

Figure 12:
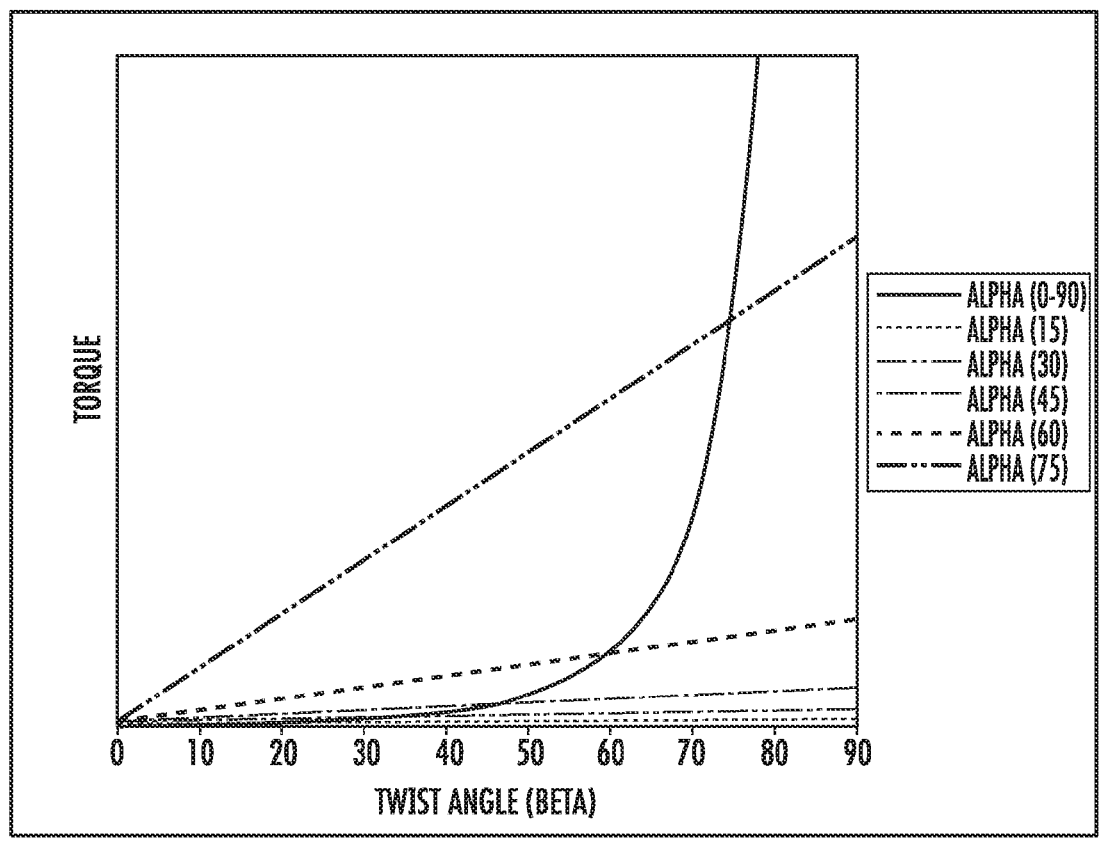
FIG. 12 shows a graph of torque (T) compared to twist angle ($\beta_t$) for various cam configurations.

FIG. 12 shows the relationship of torque (T) compared to twist angle ($β_t$) for various cam configurations assuming that the spring constant (k) and the distance (R) of the resistive force ($F_τ$) from the fulcrum remain constant. For each of the embodiments in which the cam angle (α) is held constant, the twist angle ($\beta_t$) and the torque (T) have a linear relationship, wherein the torque (T) continually increases with increasing twist angles ($\beta_t$). For a given twist angle ($\beta_t$), the torque (T) is also higher at larger cam angles ($\alpha$) as previously discussed. If the cam angle ($\alpha$) is not held constant, the twist angle ($\beta_t$) and the torque (T) have a non-linear relationship (e.g., the cam angle continually increases at the same rate as the twist angle ($\beta_t$) as shown in FIG. 12.)

Thus, embodiments of the variable rate stabilizer bar are disclosed. One skilled in the art will appreciate that the variable rate stabilizer bar invention can be practiced with embodiments other than those disclosed. The disclosed embodiments are presented for purposes of illustration and not limitation, and the present invention is limited only by the claims that follow.

What is claimed is:

1. A variable rate stabilizer bar apparatus, comprising:
   first and second stabilizer bar members each adapted to be operatively coupled to a respective, opposite ground-engaging element of a vehicle, each of the stabilizer bar members being configured to experience a torque about their longitudinal axis upon movement of the respective ground-engaging element relative to the vehicle when operatively coupled to the ground-engaging elements; and
   a torque transfer regulator operatively coupled to both stabilizer bar members and configured to transfer a portion of the torque experienced by one of the stabilizer bar members to the other stabilizer bar member, the torque transfer regulator comprising:
      a cam operatively coupled to the first stabilizer bar member and having a first cam surface extending non-parallel to the longitudinal axis of the first stabilizer bar member;
      the cam being configured to translate axially along the first stabilizer bar member and restrained from rotating about the longitudinal axis relative to the first stabilizer bar member;
      a first cam follower operatively coupled to the second stabilizer bar member, the first cam follower being unable to rotate about the longitudinal axis relative to the second stabilizer bar member, the first cam follower being adapted to interface with the first cam surface for movement along the first cam surface in response to relative rotation between the first and second stabilizer bar members; and
      an energy source operatively coupled to at least one of the stabilizer bar members, the energy source being configured to bias the cam toward the second stabilizer bar member and to bias the first cam surface toward the first cam follower;
      wherein the interface between the first cam follower with the first cam surface is configured to oppose the bias of the energy source to move the cam longitudinally away from the second stabilizer bar member in response to relative rotation of the first stabilizer bar member away from the second stabilizer bar member in either of opposing rotational directions and corresponding movement of the first cam follower along the first cam surface.

2. The apparatus of claim 1, further comprising a controller to actively control the portion of torque that is transferred from one stabilizer bar member to the other while the vehicle is in use.

3. The apparatus of claim 1, further comprising a stop operatively coupled to the first stabilizer bar member, the stop being configured to assist the energy source in biasing the cam toward the second stabilizer bar member.

4. The apparatus of claim 3, wherein the stop is positionable to exert a pre-load on the energy source.

5. The apparatus of claim 4, wherein the torque transfer regulator further comprises a controller operatively coupled to the stop, and the stop is actively positionable via the controller.

6. The apparatus of claim 1, wherein the energy source comprises a spring.

7. The apparatus of claim 1, wherein the energy source comprises a Belleville washer.

8. The apparatus of claim 1, wherein the first cam follower comprises a roller configured to roll along the first cam surface.

9. The apparatus of claim 1, wherein the torque transfer regulator comprises a second cam follower, and wherein the cam comprises a second cam surface adapted to interface with the second cam follower.

10. The apparatus of claim 1, wherein a tab and groove assembly is configured to completely impede the cam from rotating about the longitudinal axis relative to the first stabilizer bar member.

11. The apparatus of claim 1, wherein at least one of the stabilizer bar members comprises a cylindrical cross-section.

12. The apparatus of claim 1, wherein the first cam surface comprises a nonlinear section.

13. The apparatus of claim 1, wherein the cam defines a slot within which the first cam follower is configured to travel.

14. A vehicle, comprising:
   a chassis carrying a seat;
   a pair of ground-engaging elements coupled to the chassis;
   an engine carried by the chassis for powering the vehicle; and
   a suspension system comprising a stabilizer bar that includes:
      first and second stabilizer bar members each operatively coupled to one of the ground-engaging elements, each of the stabilizer bar members being configured to experience a torque about their longitudinal axis upon movement of the respective ground-engaging element relative to the chassis; and
      means for transferring a portion of the torque experienced by one of the stabilizer bar members to the other stabilizer bar member, the means for transferring including a cam supported by the first stabilizer bar member, a first cam follower supported by the second stabilizer bar member and configured to interface with and move relatively away from the cam in an axial direction in response to relative rotation of the cam follower and the cam away from each other in either of opposing directions, and means for biasing the cam toward the first cam follower to oppose the interface of the cam and the first cam follower.

15. The vehicle of claim 14, wherein the seat comprises a straddle-type seat.

16. The vehicle of claim 14, wherein the suspension system further comprises a controller to actively control the portion of torque that is transferred from one stabilizer bar member to the other while the vehicle is in use.

17. The vehicle of claim 14, wherein at least one of the stabilizer bar members comprises a cylindrical cross section.

18. The vehicle of claim 14, wherein the means comprises a torque transfer regulator operatively coupled to both stabilizer bar members, the torque transfer regulator comprising:
   a tab and groove assembly configured to allow the cam to translate axially along the first stabilizer bar member and to impede the cam from rotating about the longitudinal axis relative to the first stabilizer bar member;

the cam including a first cam surface;

the first cam follower being unable to rotate about the longitudinal axis relative to the second stabilizer bar member, and an energy source operatively coupled to the first stabilizer bar member, the energy source being configured to bias the cam toward the second stabilizer bar member.

19. The vehicle of claim 18, wherein the torque transfer regulator further comprises a stop operatively coupled to the first stabilizer bar member, the stop being configured to assist the energy source in biasing the cam toward the second stabilizer bar member.

20. The vehicle of claim 19, wherein the stop is positionable to exert a pre-load on the energy source.

21. The vehicle of claim 20, wherein the torque transfer regulator further comprises a controller operatively coupled to the stop, and the stop is actively positionable via the controller.

22. The vehicle of claim 18, wherein the energy source comprises a spring.

23. The vehicle of claim 18, wherein the energy source comprises a Belleville washer.

24. The vehicle of claim 18, wherein the first cam follower comprises a roller configured to roll along the first cam surface.

25. The vehicle of claim 18, wherein the torque transfer regulator comprises a second cam follower, and wherein the cam comprises a second cam surface adapted to interface with the second cam follower.

26. The vehicle of claim 18, wherein the tab and groove assembly is configured to completely impede the cam from rotating about the longitudinal axis relative to the first stabilizer bar member.

27. The vehicle of claim 18, wherein the first cam surface comprises a nonlinear section.

28. The vehicle of claim 18, wherein the cam defines a slot within which the first cam follower is configured to travel.

29. A stabilizer bar kit for use in a vehicle, the kit comprising: a variable rate stabilizer bar that includes:

first and second stabilizer bar members each operable to be coupled to a respective, opposite ground-engaging element of a vehicle, each of the stabilizer bar members being configured to experience a torque about their longitudinal axis upon movement of the respective ground-engaging element relative to the vehicle when coupled to the ground-engaging elements, and a torque transfer regulator coupled to both stabilizer bar members and configured to transfer a portion of the torque experienced by one of the stabilizer bar members to the other stabilizer bar member, the torque transfer regulator comprising:

a cam operatively coupled to the first stabilizer bar member and having a first cam surface extending nonparallel to the longitudinal axis of the first stabilizer bar member;

the cam being configured to translate axially along the first stabilizer bar member and restrained from rotating about the longitudinal axis relative to the first stabilizer bar member;

a first cam follower operatively coupled to the second stabilizer bar member, the first cam follower being unable to rotate about the longitudinal axis relative to the second stabilizer bar member, the first cam follower being configured to interface with the first cam surface for relative rotational and longitudinal movement along the first cam surface in response to relative rotation between the first and second stabilizer bar members; and a plurality of energy sources operable to be coupled to the first stabilizer bar member, the energy sources being configured to bias the cam toward the second stabilizer bar member and to bias the first cam surface toward the first cam follower when coupled to the first stabilizer bar member;

wherein the interface between the first cam follower with the first cam surface is configured to oppose the bias of the energy sources to move the cam longitudinally away from the second stabilizer bar member in response to relative rotation of the first stabilizer bar member away from the second stabilizer bar member and corresponding movement of the first cam follower along the first cam surface.

30. The kit of claim 29, wherein at least two energy sources are Belleville washers.

31. The kit of claim 29, wherein at least two energy sources are springs.

32. The kit of claim 31, wherein at least two of the springs have different spring constants.

33. The kit of claim 29, wherein a tab and groove assembly is configured to completely impede the cam from rotating about the longitudinal axis relative to the first stabilizer bar member.

34. The apparatus of claim 1, further comprising a tab and groove assembly configured to allow the cam to translate axially along the first stabilizer bar member and to impede the cam from rotating about the longitudinal axis relative to the first stabilizer bar member.

35. The kit of claim 29, further comprising a tab and groove assembly configured to allow the cam to translate axially along the first stabilizer bar member and to impede the cam from rotating about the longitudinal axis relative to the first stabilizer bar member.

* * * * *